(12) United States Patent
Tsukada et al.

(10) Patent No.: US 7,316,630 B2
(45) Date of Patent: Jan. 8, 2008

(54) CONTROL METHOD AND APPARATUS FOR A CONTINUOUSLY VARIABLE TRANSMISSION

(75) Inventors: Yoshiaki Tsukada, Saitama (JP); Takashi Ozeki, Saitama (JP); Masahiro Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 11/148,054

(22) Filed: Jun. 8, 2005

(65) Prior Publication Data

US 2006/0030449 A1 Feb. 9, 2006

(30) Foreign Application Priority Data

Aug. 9, 2004 (JP) ............................. 2004-232176

(51) Int. Cl.
*B60K 1/02* (2006.01)
(52) U.S. Cl. ............................. 477/3; 477/44; 477/175; 192/45; 192/48.92; 192/105 CD; 180/65.2; 180/65.4
(58) Field of Classification Search .................... None
See application file for complete search history.

(56) References Cited

U.S. PATENT DOCUMENTS

| 6,269,895 | B1 * | 8/2001 | Tanuguchi et al. ......... 180/65.2 |
| 6,344,008 | B1 * | 2/2002 | Nagano et al. ................. 475/1 |
| 6,524,216 | B2 * | 2/2003 | Suzuki et al. .................. 477/3 |
| 7,110,877 | B2 * | 9/2006 | Ozeki et al. ................. 701/112 |
| 7,191,881 | B2 * | 3/2007 | Tsukada et al. ............... 192/45 |

FOREIGN PATENT DOCUMENTS

JP 2003-014004 1/2003

* cited by examiner

*Primary Examiner*—David D. Le
(74) *Attorney, Agent, or Firm*—Carrier, Blackman & Associates, P.C.; Joseph P. Carrier; William D. Blackman

(57) ABSTRACT

A control apparatus for a continuously variable transmission ensures good acceleration performance during staffing operations, and following an engine stall occurring before a gear ratio of the continuously variable transmission is shifted back to a low speed. The control apparatus includes sensors, a gear ratio return control unit, and a one-way clutch. One sensor detects a gear ratio of a continuously variable transmission. Another sensor detects whether an engine is in a stationary state. The gear ratio return control unit drives a motor in a backward direction when the engine is in the stationary state and the gear ratio of the continuously variable transmission is other than a low gear ratio. The one-way clutch turns idly relative to a backward drive of the output shaft. The gear ratio return control unit brings the motor to a stop when the gear ratio of the continuously variable transmission lowers sufficiently.

20 Claims, 6 Drawing Sheets

CONTROL METHOD AND APPARATUS FOR A CONTINUOUSLY VARIABLE TRANSMISSION

CROSS-REFERENCE TO RELATED APPLICATIONS

The present invention claims priority under 35 USC 119 based on Japanese patent application Ser. No. 2004-232176, filed on Aug. 9, 2004. The subject matter of this priority document is incorporated by reference herein.

BACKGROUND OF THE INVENTION

1. Field of the Invention

The present invention relates to a control method and apparatus for a continuously variable transmission. More specifically, the present invention relates to a control method and apparatus adapted to be used with a belt-type continuously variable transmission.

2. Description of the Background Art

Many types of transmissions are known for transmitting power from an engine to a driving wheel of a vehicle. One example of a known belt-type continuously variable transmission, for transmitting an engine driving force to a driving wheel, includes a centrifugal starting clutch provided on an output shaft (a driven side). In such an arrangement, an input of torque from the driving wheel to the transmission can be temporarily interrupted when the vehicle is brought to a sudden stop. Accordingly, a gear ratio of the continuously variable transmission can be shifted to a low speed condition for starting (a low side) if the engine keeps on running. A torque reduction is, however, applied to the output shaft of the continuously variable transmission at this time. This results in a need for increasing the capacity of the transmission's starting clutch, leading to an increase in the dimensions or weight of the mechanism.

In another example of a known transmission, a starting clutch is provided on an input shaft (a driving side) of the continuously variable transmission. In such an arrangement, the gear ratio of the continuously variable transmission does not return to the low speed side, even when the vehicle is brought to a sudden stop. In such a case, a new technical problem arises. Specifically, sufficient acceleration performance cannot be obtained, since the gear ratio of the continuously variable transmission is not in the low speed side when the vehicle is restarted.

Japanese Laid-open Patent No. 2003-14004 discloses a transmission system that accomplishes the following operation. Specifically, a selector mechanism for connecting and disconnecting the transmission of power to a driving wheel is provided on an output shaft of a continuously variable transmission. The selector mechanism is controlled so as to temporarily disconnect the transmission power from the wheels, when a vehicle is brought to a sudden stop. Prior to this disconnection of transmission power, a starting clutch is released. The power from the continuously variable transmission to the driving wheel is thereafter disconnected. After the disconnection of transmission power, the starting clutch is engaged again.

The prior art apparatus described above prevents the engine from stalling, when the vehicle is brought to a sudden stop. There is, however, a technical problem that needs to be addressed. Specifically, if the engine stops before the gear ratio of the continuously variable transmission is shifted to the low speed side, the vehicle has to be started next time with the transmission at a position other than the low speed position. As a result, a good acceleration performance cannot be obtained.

It is therefore an object of the present invention to solve the technical problem of the prior art, and to provide a control method and apparatus for a continuously variable transmission ensuring good acceleration performance during a starting operation which follows an engine stall, occurring before a gear ratio of the continuously variable transmission is shifted back to a low speed side.

SUMMARY OF THE INVENTION

To achieve the foregoing object, the present invention provides a control apparatus for a continuously variable transmission mechanism having a belt-type continuously variable transmission, an input shaft thereof being connected to a crankshaft of an engine through a staffing clutch and an output shaft thereof being connected to a driving shaft, the starting clutch being connected when a speed of the crankshaft exceeds a predetermined value, thus allowing power of the engine to be transmitted to the driving shaft through the continuously variable transmission.

The control apparatus for the continuously variable transmission according to the present invention is characterized as follows:

The control apparatus for a continuously variable transmission mechanism, according to a first selected illustrative embodiment of the invention, includes a one-way clutch disposed between the driving shaft and the output shaft of the continuously variable transmission. In the system according to the first illustrative embodiment, the clutch is capable of rotating idly relative to a backward drive of the output shaft. The transmission control apparatus according to the first embodiment also includes a gear ratio detector for detecting a gear ratio of the continuously variable transmission; an engine state detector for detecting whether the engine is in a stationary or moving state; and a crankshaft driver, for driving the crankshaft such that the belt of the continuously variable transmission rotates backward when the engine is in the stationary state and the gear ratio of the continuously variable transmission is greater than a predetermined reference value.

The crankshaft driver of the control apparatus includes a motor connected to the crankshaft and controller for controlling the motor.

The controller of the apparatus is operable to turn the crankshaft backward at a speed at which the starting clutch is connected.

The apparatus may further include a second one-way clutch, disposed between the crankshaft and a driving pulley of the continuously variable transmission. The second one-way clutch transmits a backward drive of the crankshaft to the driving pulley, while turning idly relative to a forward drive of the crankshaft.

The crankshaft driver of the control apparatus stops driving the crankshaft when the gear ratio of the continuously variable transmission decreases to the predetermined reference value.

The control apparatus' detection of the gear ratio of the continuously variable transmission detects the gear ratio based on a ratio of a speed of the input shaft to a speed of the output shaft of the continuously variable transmission.

The continuously variable transmission has a driving pulley on the input shaft thereof and a driven pulley on the output shaft thereof, in which the driving pulley and the driven pulley each include a fixed pulley and a movable pulley, respectively. The gear ratio detection device of the continuously variable transmission detects the gear ratio based on an amount of movement of at least the movable pulley of either the driving pulley or the driven pulley.

The control apparatus has a driving motor as a power source for a vehicle, which is connected to the driving shaft.

According to the present invention, the following effects are achieved:

According to a first aspect of the present invention, if the continuously variable transmission is in a state other than the low gear ratio state when the engine is brought to a stop, the crankshaft is forcedly turned at a low speed slightly above the clutch-in speed of the starting clutch. This returns the continuously variable transmission to the low gear ratio state. This allows the vehicle to start next time from the low gear ratio state, ensuring good acceleration performance. Further, since the output shaft of the continuously variable transmission is connected to the driving shaft through the one-way clutch, power of backward rotation of the crankshaft is not transmitted to the driving wheel.

According to a second aspect of the present invention, a motor is used to forcedly drive the continuously variable transmission. Accordingly, it is not necessary to restart the engine when the continuously variable transmission is to be returned to the low gear ratio state.

According to a third aspect of the present invention, even when the continuously variable transmission is connected to the crankshaft via the starting clutch, the continuously variable transmission can be returned to the low gear ratio state by turning the crankshaft backward.

According to a fourth aspect of the present invention, even when the continuously variable transmission is connected to the crankshaft via the starting clutch, the continuously variable transmission can be returned to the low gear ratio state without having to increase the speed of the crankshaft to the clutch-in speed of the starting clutch. That is, the continuously variable transmission can be returned to the low gear ratio state with small power consumption.

According to a fifth aspect of the present invention, the gear ratio of the continuously variable transmission can be positively returned to the low gear ratio state. Not only that, but the motor is also automatically stopped when the gear ratio is returned to the low gear ratio state. This prevents wasteful consumption of electric power.

According to sixth and seventh aspects of the present invention, the gear ratio of the continuously variable transmission can be accurately detected with a simple structure.

According to an eighth aspect of the present invention, the driving motor can be prevented from following to turn even when the driven side of the continuously variable transmission is turned backward when the crankshaft is turned backward. This keeps low power consumed when the crankshaft is turned backward.

DETAILED DESCRIPTION OF THE ILLUSTRATIVE EMBODIMENT

Figure 1:
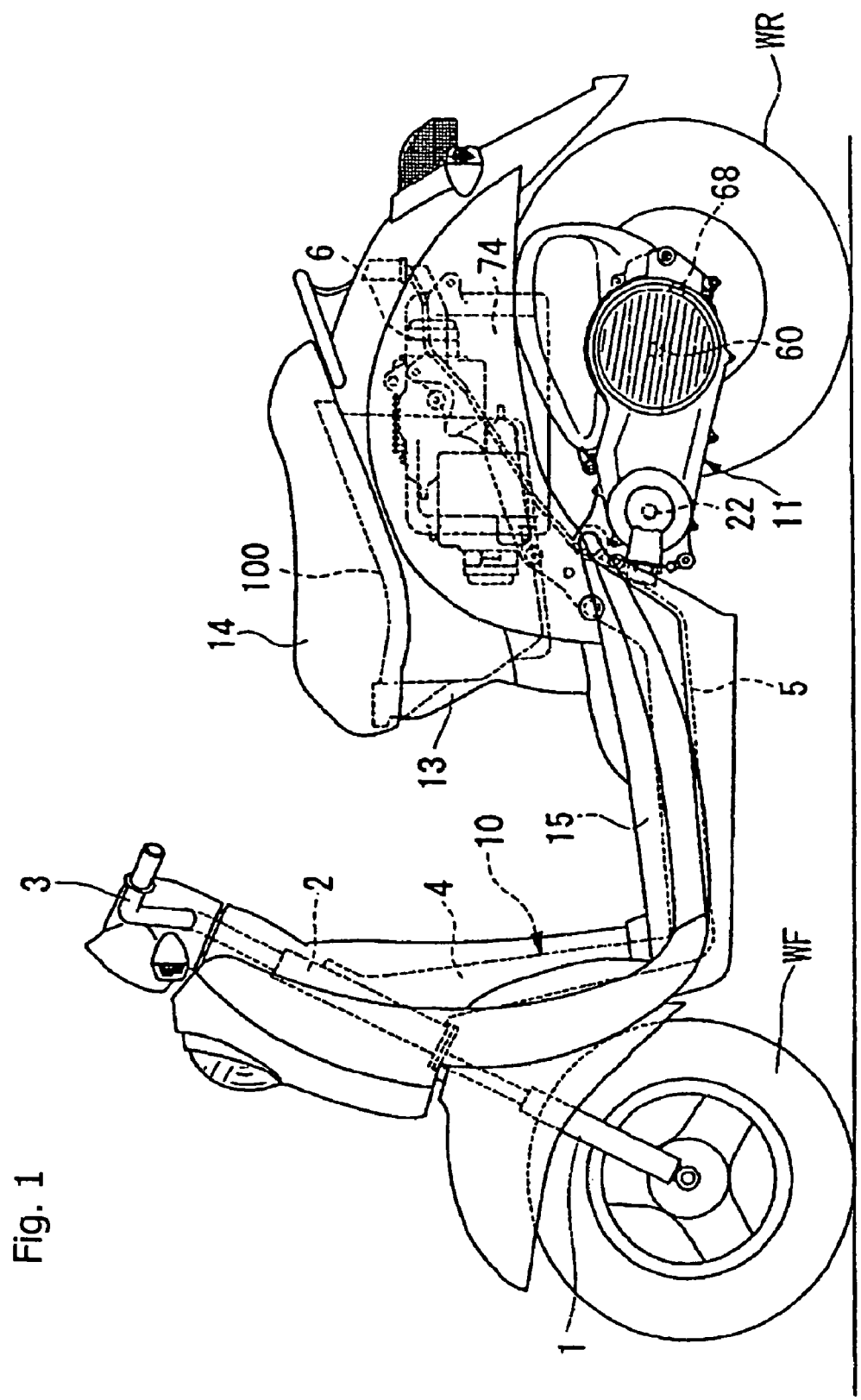
FIG. 1 is a side elevational view of a two-wheeled hybrid vehicle according to a selected illustrative embodiment of the present invention, showing a power unit mounted on a rear portion of the vehicle frame.

A selected illustrative embodiment of the present invention will now be described in detail, with reference to the accompanying drawings. FIG. 1 shows a hybrid vehicle according to an embodiment of the present invention. The hybrid vehicle of FIG. 1 is provided with an automatic engine stop function that brings the engine to an automatic stop when a brake is operated during running. The automatic engine stop function is provided for improved specific fuel consumption. Throughout the present specification and in the claims, an engine that has stopped running pursuant to the "automatic engine stop" function referred to above, will be referred to as being in a "stationary" state, whether or not the vehicle is moving or stationary.

The hybrid vehicle includes a front fork 1 for rotatably supporting a front wheel WF at a point forward of a vehicle body. The front fork 1 is pivotally supported on a head pipe 2. The front fork 1 can be steered through operation of a handlebar 3. A down pipe 4 is fitted to the head pipe 2 so as to extend rearwardly and downwardly therefrom. An intermediate frame 5 is extended substantially horizontally from a lower end of the down pipe 4. A rear frame portion 6 is formed extending rearwardly and upwardly from a trailing end of the intermediate frame 5.

A vehicle body frame 10, as constructed above, supportively carries a power unit 11 therein, including a power source. One end of the power unit 11 is pivotally secured to the vehicle body frame 10. A rear wheel WR, functioning as a driving wheel, is rotatably mounted to the frame 10, at the back of the power unit 11. The power unit 11 is suspended by a rear cushion mounted on the rear frame portion 6.

A vehicle body cover 13 covers an outer periphery of the vehicle body frame 10. A seat 14, on which a rider sits, is secured rearward and on a top surface of the vehicle body cover 13. A step floor 15, on which the rider rests his or her feet, is formed outside of the intermediate frame 5 below and forward of the seat 14. A storage box 100 is formed in the body cover 13 and disposed below the seat 14. The storage box 100 functions as a utility space for storing a helmet, luggage, or the like.

Figure 2:
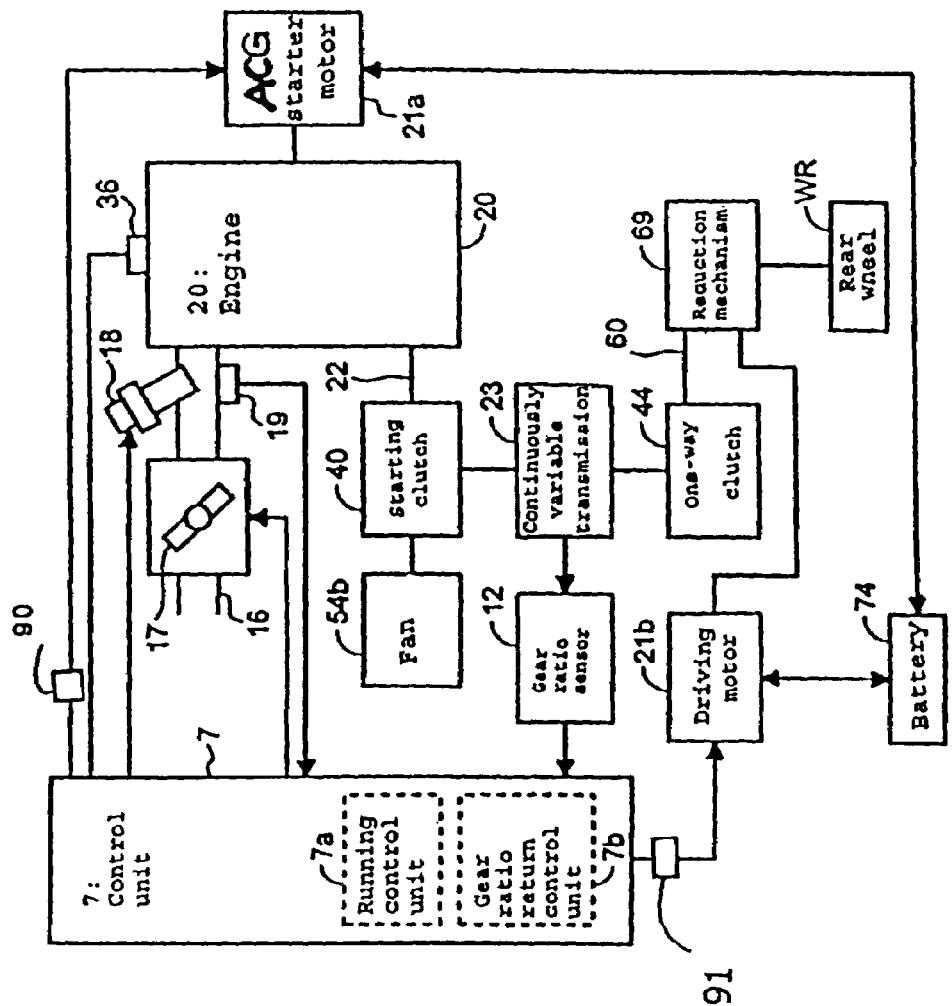
FIG. 2 is a simplified schematic block diagram of a continuously variable transmission control system suitable for use with the two-wheeled vehicle of FIG. 1.

FIG. 2 is a simplified schematic block diagram showing a system configuration of the hybrid vehicle described above. As used throughout the present specification and in the claims, the term "engine" generally refers to an internal combustion engine, and the term "motor" generally refers to an electric motor. The power unit 11 includes an engine 20, an ACG starter motor 21a, a continuously variable transmission (power transmission mechanism) 23, a starting clutch 40, a driving motor 21b, a one-way clutch (one-way power transmission mechanism) 44, and a reduction mechanism 69. Specifically, the ACG staffer motor 21a functions as an engine staffer and/or as a generator. The continuously variable transmission 23 is connected to a crankshaft 22 and transmits power of the engine 20 to the rear wheel WR. The staffing clutch 40 connects or disconnects power transmission between the crankshaft 22 and the continuously variable transmission 23. The driving motor 21b functions as a motor or a generator. The one-way clutch 44 transmits power from the engine 20 and/or the driving motor 21b to the rear wheel WR, but not from the rear wheel WR to the engine 20. The reduction mechanism 69 transmits an output from the continuously variable transmission 23 at a reduced speed to the rear wheel WR. A gear ratio sensor 12 detects a gear ratio Rm of the continuously variable transmission 23. An engine speed sensor 36 detects an engine speed Ne of the engine 20.

Power from the engine 20 is transmitted from the crankshaft 22 to the rear wheel WR via the starting clutch 40, the continuously variable transmission 23, the one-way clutch 44, a driving shaft 60, and the reduction mechanism 69. Power from the driving motor 21b, on the other hand, is transmitted to the rear wheel WR via the driving shaft 60 and the reduction mechanism 69. That is, according to the illustrative embodiment of the present invention, the driving shaft 60 serves as an output shaft of the driving motor 21b.

A battery 74 is connected to the ACG starter motor 21a and also to the driving motor 21b. When the driving motor 21b functions as a motor, and when the ACG starter motor 21a functions as a starter, the battery 74 supplies power to the ACG starter motor 21a and the driving motor 21b. When the ACG starter motor 21a and the driving motor 21b function as generators, the battery 74 is recharged by regenerative power generated by the ACG starter motor 21a and/or the driving motor 21b. A running control sub-unit 7a of a control unit 7 controls the engine 20, ACG starter motor 21a, and the driving motor 21b.

A throttle valve 17, for controlling the amount of intake air sent to the engine, is pivotally mounted in an intake pipe 16 of the engine 20. The throttle valve 17 is opened proportionally according to the amount of operation of a throttle grip (not shown) operated by the rider. An injector 18 and a vacuum sensor 19 are disposed between the throttle valve 17 and the engine 20. The injector 18 injects fuel. The vacuum sensor 19 detects a reduced or negative pressure in the intake pipe.

Figure 3:
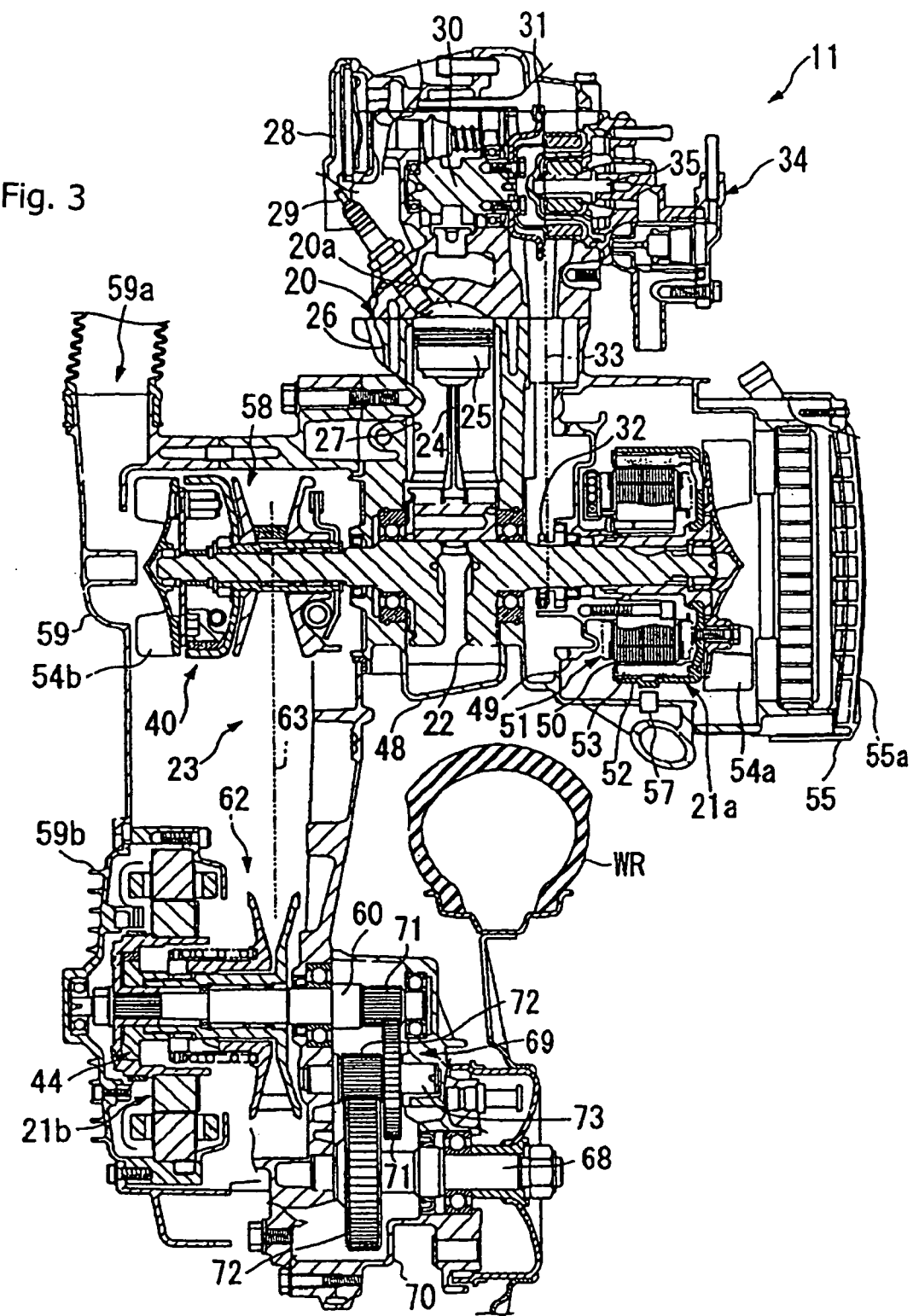
FIG. 3 is a cross sectional view of the power unit showing the engine and transmission system of the two-wheeled vehicle shown in FIG. 1.

The construction of the power unit 11, including the engine 20 and the driving motor 21b, will now be described, with reference to FIG. 3.

The engine 20 includes a piston 25 connected to the crankshaft 22 via a connecting rod 24. The piston 25 can slide inside a cylinder 27 disposed in a cylinder block 26. The cylinder block 26 is disposed such that an axis of the cylinder 27 runs substantially horizontally. A cylinder head 28 is secured to a front surface of the cylinder block 26. The cylinder head 28, the cylinder 27, and the piston 25 constitute a combustion chamber 20a for burning an air-fuel mixture.

The cylinder head 28 includes a valve (not shown) for controlling intake or exhaust of the air-fuel mixture to or from the combustion chamber 20a, and an ignition plug 29. Opening or closing of the valve is controlled through rotation of a camshaft 30 rotatably supported on the cylinder head 28. A driven sprocket 31 is mounted on one end of the camshaft 30. An endless cam chain 33 is wound around the driven sprocket 31 and a drive sprocket 32 disposed on one end of the crankshaft 22. A water pump 34 for cooling the engine 20 is mounted on the one end of the camshaft 30. The water pump 34 is mounted such that a rotational axis 35 thereof rotates integrally with the camshaft 30. Accordingly, rotating the camshaft 30 operates the water pump 34.

A stator case 49 is connected on the right-hand side in a vehicle width direction of a crankcase 48 that rotatably supports the crankshaft 22. The ACG starter motor 21a is housed in the stator case 49. The ACG starter motor 21a is what is called an outer rotor type. A stator of the ACG starter motor 21a includes a coil 51, which is a conductive wire wound around teeth 50 secured to the stator case 49. An outer rotor 52 is, on the other hand, secured to the crankshaft 22. The outer rotor 52 is of a substantially cylindrical shape covering an outer periphery of the stator. A magnet 53 is disposed on an inner peripheral surface of the outer rotor 52.

The outer rotor 52 includes a fan 54a for cooling the ACG starter motor 21a. When the fan 54a rotates in synchronism with the crankshaft 22, cooling air is drawn in through a cooling air intake port 59a formed in a side surface 55a of a cover 55 of the stator case 49. The cooling air is drawn in this manner.

A transmission case 59 is connected to the left-hand side in the vehicle width direction of the crankcase 48. A fan 54b, the continuously variable transmission 23, and the driving motor 21b are housed in the transmission case 59. The fan 54b is secured to a left end portion of the crankshaft 22. A driving side of the continuously variable transmission 23 is connected to the crankshaft 22 via the starting clutch 40. The driving motor 21b is connected to a driven side of the continuously variable transmission 23. The fan 54b functions to cool the continuously variable transmission 23 and the driving motor 21b housed in the transmission case 59. The fan 54b is disposed on the same side as the driving motor 21b relative to the continuously variable transmission 23, that is, on the left-hand side in the vehicle width direction according to the illustrative embodiment of the present invention.

The cooling air intake port 59a is formed forward and on the left of the vehicle body of the transmission case 59. When the fan 54b rotates in synchronism with the crankshaft 22, an outside air is drawn in the transmission case 59 through the cooling air intake port 59a located near the fan 54b. The driving motor 21b and the continuously variable transmission 23 are forcedly cooled by the outside air thus drawn in.

The continuously variable transmission 23 is a belt converter including a driving side transmission pulley 58 and a driven side transmission pulley 62, with an endless V-belt (endless belt) 63 wound therearound. The driving side transmission pulley 58 is mounted via the starting clutch 40 at a left end portion of the crankshaft 22 protruding in the vehicle width direction from the crankcase 48. The driven side transmission pulley 62 is mounted via the one-way clutch 44 on the driving shaft 60 rotatably supported with an axis running parallel with the crankshaft 22 on the transmission case 59.

Figure 4:
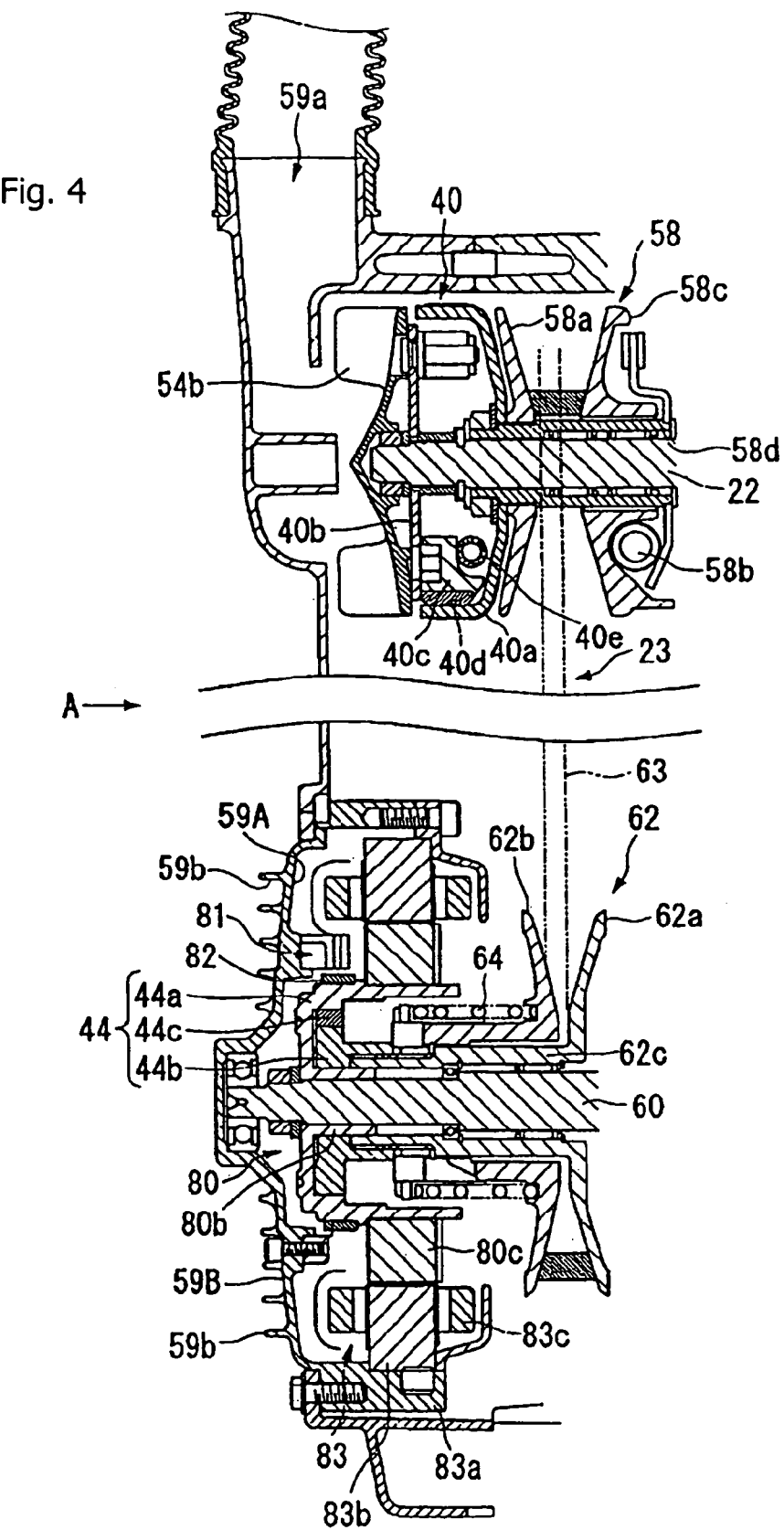
FIG. 4 is a cross sectional detail view of part of the transmission of FIG. 3, showing the starting clutch operatively connected to the crankshaft, and the one-way clutch operatively connected to the driveshaft.

Referring to FIG. 4 that is an enlarged view showing a principal part of the continuously variable transmission 23, the driving side transmission pulley 58 includes a sleeve 58d, a driving side fixed pulley half 58a, and a driving side movable pulley half 58c. The sleeve 58d is circumferentially rotatably mounted on the crankshaft 22, while being restricted in its axial movement relative to the crankshaft 22. The driving side fixed pulley half 58a is fixed to the sleeve 58d. The driving side movable pulley half 58c is mounted on the sleeve 58d such that the pulley half 58c is axially movable, but unable to make a circumferential movement relative to the sleeve 58d.

The driven side transmission pulley 62, on the other hand, includes a driven side fixed pulley half 62a and a driven side movable pulley half (driven side movable pulley) 62b. The driven side fixed pulley half 62a is circumferentially rotatably mounted on the driving shaft 60, while being restricted in its axial movement relative to the driving shaft 60. The driven side movable pulley half 62b is axially movably mounted on a boss portion 62c of the driven side fixed pulley half 62a.

An endless V belt 63 is wound around each of belt grooves having substantially a V-shaped cross section formed between the driving side fixed pulley half 58a and the driving side movable pulley half 58c, and between the driven side fixed pulley half 62a and the driven side movable pulley half 62b.

A spring (elastic member) 64 is disposed on the backside (on the left-hand side in the vehicle width direction) of the driven side movable pulley half 62b. The spring 64 urges the driven side movable pulley half 62b toward the driven side fixed pulley half 62a at all times.

In this structure, when the speed of the crankshaft 22 increases, the following occur in the driving side transmission pulley 58. Specifically, a centrifugal force acts on a weight roller 58b, moving the driving side movable pulley half 58c toward the driving side fixed pulley half 58a. The driving side movable pulley half 58c then comes closer to the driving side fixed pulley half 58a by the amount of the movement. This decreases a groove width of the driving side transmission pulley 58. A position of contact between the driving side transmission pulley 58 and the V belt 63 is then deviated radially outward along the driving side transmission pulley 58, causing a winding diameter of the V belt 63 to increase. This results in the following occurring in the driven side transmission pulley 62. Specifically, a groove width formed by the driven side fixed pulley half 62a and the driven side movable pulley half 62b increases. That is, the winding diameter of the V belt 63 (a transmission pitch diameter) continuously varies according to the speed of the crankshaft 22. This results in the gear ratio being automatically and steplessly varied.

The starting clutch 40 is disposed on an outboard side of the continuously variable transmission 23 (on the left-hand side in the vehicle width direction according to the illustrative embodiment of the present invention). Specifically, the clutch 40 is disposed between the driving side fixed pulley half 58a and the fan 54b at a point near the cooling air intake port 59a formed in the transmission case 59.

The starting clutch 40 includes an outer case 40a, an outer plate 40b, a weight 40c, a shoe 40d, and a spring 40e. The outer case 40a is formed in a cup shape and is fixed to the sleeve 58d. The outer plate 40b is fixed on a left end portion of the crankshaft 22. The shoe 40d is mounted on an external line portion of the outer plate 40b via the weight 40c, so as to face radially outwardly. The spring 40e urges the shoe 40d radially inward.

In this structure, power transmission between the crankshaft 22 and the continuously variable transmission 23 is disconnected when the engine speed, or the speed of the crankshaft 22 is equal to, or less than, a predetermined value (e.g., 3000 rpm). As the engine speed increases and the speed of the crankshaft 22 exceeds the predetermined value, the centrifugal force acting on the weight 40c counteracts an elastic force acting radially inward by the spring 40e, moving the weight 40c radially outward. This causes the shoe 40d to press an inner peripheral surface of the outer case 40a with a force of a predetermined value or more. This causes rotation of the crankshaft 22 to be transmitted to the sleeve 58d via the outer case 40a. The driving side transmission pulley 58 being fixed to the sleeve 58d is thereby driven.

The one-way clutch 44 includes an outer clutch 44a, an inner clutch 44b, and a roller 44c. The outer clutch 44a is of a cup shape. The inner clutch 44b is internally inserted in the outer clutch 44a coaxially therewith. The roller 44c allows power to be transmitted in one direction only from the inner clutch 44b to the outer clutch 44a. The outer clutch 44a serves also as an inner rotor main body for the driving motor 21b. The outer clutch 44a is formed of the same member as the inner rotor main body. In addition, an inner periphery of the inner clutch 44b and a left end portion of the boss portion 62c of the driven side fixed pulley half 62a are mutually in a splined connection.

In this structure, power from the side of the engine 20 transmitted to the driven side transmission pulley 62 of the continuously variable transmission 23 is transmitted to the rear wheel WR by way of the driven side fixed pulley half 62a, the inner clutch 44b, the outer clutch 44a or the inner rotor main body, the driving shaft 60, and the reduction mechanism 69. Power from the side of the rear wheel WR generated as the vehicle is pulled by walking, during regenerative operation, or the like, on the other hand, is transmitted to the reduction mechanism 69, the driving shaft 60, and the inner rotor main body or the outer clutch 44a. The power generated in the latter case is not, however, transmitted to the continuously variable transmission 23 and the engine 20 since the outer clutch 44a turns idly relative to the inner clutch 44b.

The driving motor 21b of an inner rotor type is disposed rearward of the transmission case 59. The driving motor 21b uses the driving shaft 60 as its output shaft.

An inner rotor 80 includes the driving shaft 60, an inner rotor main body or the inner clutch 44b, and a magnet 80c. The driving shaft 60 serves also as an output shaft for the continuously variable transmission 23. The inner clutch 44b is in splined engagement with the driving shaft 60 by a cup-shaped boss portion 80b formed at a central portion thereof. The magnet 80c is disposed on an outer peripheral surface on an open side of the inner clutch 44b. A plurality of detected bodies 82 is mounted on an outer peripheral surface on the side of a bottom portion of the inner clutch 44b. A rotor sensor 81 mounted on an inner wall 59A of the transmission case 59 detects the plurality of detected bodies 82. A stator 83, on the other hand, includes a coil 83c, which is a conductive wire wound around teeth 83b, secured to a stator case 83a inside the transmission case 59.

The driving motor 21b functions as a motor when assisting the output of the engine 20. Alternately, when braking, the driving motor 21b converts rotation of the driving shaft 60 to a corresponding electric energy, thereby functioning as a generator for recharging the battery 74, not shown in FIG. 2. The driving motor 21b is directly mounted on the inner wall 59A of the transmission case 59 made of metal via the stator case 83a. A plurality of cooling fins 59b extending in a vehicle fore-aft direction, each being spaced apart from each other, is disposed on an outer wall 59B of the transmission case 59 corresponding to the portion, at which the driving motor 21b is mounted.

Referring back to FIG. 3, the reduction mechanism 69 is disposed in a transmission chamber 70 that continues to the right-hand side at a trailing end portion of the transmission case 59. The reduction mechanism 69 includes an intermediate shaft 73 that is rotatably supported in parallel with the driving shaft 60 and an axle 68 of the rear wheel WR. The reduction mechanism 69 further includes a pair of first reduction gears 71, 71 and a pair of second reduction gears 72, 72. The first reduction gears 71, 71 are formed on a right end portion of the driving shaft 60 and a central portion of the intermediate shaft 73, respectively. The second reduction gears 72, 72 are formed on a right end portion of the intermediate shaft 73 and a left end portion of the axle 68, respectively. Through such an arrangement, the speed of rotation of the driving shaft 60 is reduced at a predetermined reduction ratio. Rotation of the driving shaft 60 is then transmitted to the axle 68 of the rear wheel WR that is rotatably supported in parallel with the driving shaft 60.

The running control sub-unit 7a of the control unit 7 receives information from the vacuum sensor 19, the engine speed sensor 36, rotor sensors 57, 81, a throttle opening sensor for detecting an opening angle of a throttle valve 17, and the like. The running control sub-unit 7a then produces an output of predefined control signals for drivers 90, 91 of the ACG starter motor 21a and the driving motor 21b, and an ignition system for operating the ignition plug 29 of the engine 20.

A gear ratio return control unit 7b of the control unit 7 detects the gear ratio Rm of the continuously variable transmission 23 when the engine 20 is brought to a stop. If the gear ratio Rm is not decreased to a predetermined low gear ratio that can achieve sufficient acceleration performance, the gear ratio return control unit 7b turns the crankshaft 22 backward at a clutch-in speed of the starting clutch, thereby enlarging the groove width of the driving side transmission pulley 58. The winding diameter of the V belt 63 is thus reduced to reduce the gear ratio.

Figure 5:
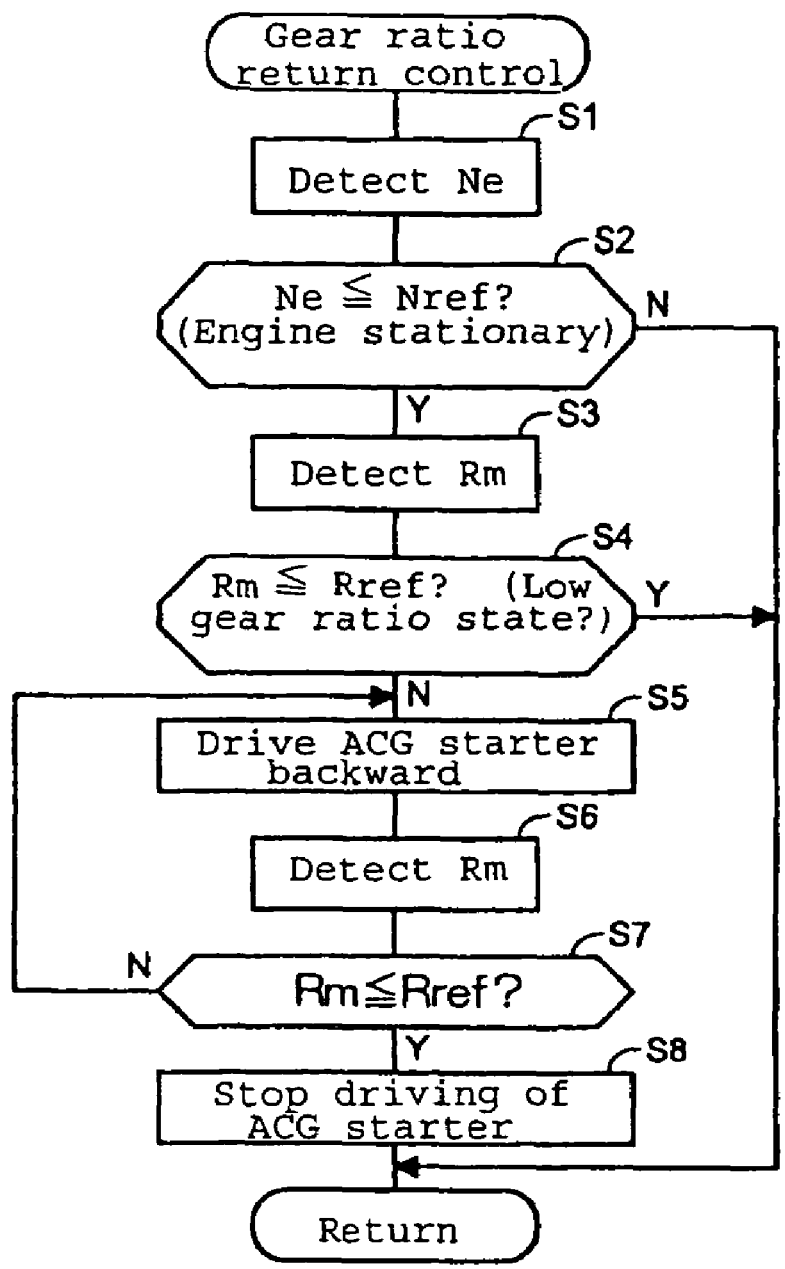
FIG. 5 is a flowchart showing the gear ratio return control process.

FIG. 5 is a flowchart showing gear ratio return processes performed by the gear ratio return control unit 7b. These processes are executed repeatedly at a predetermined cycle.

In step S1, the engine speed Ne is obtained based on an output signal from the engine speed sensor 36. In step S2, the engine speed Ne is compared with a reference speed Nref. It is thereby determined whether the engine is in a stationary state or a state of low speed rotation similar to the stationary state. If the engine speed Ne is lower than the reference speed Nref and it is determined that the engine is in the stationary state or the state of low speed rotation similar to the stationary state, the operation proceeds to step S3. In step S3, the gear ratio Rm of the continuously variable transmission 23 is obtained based on the output signal from the gear ratio sensor 12.

The gear ratio sensor 12 includes a speed sensor for detecting, for example, a speed N1 of the driving side transmission pulley 58 or the outer case 40a of the starting clutch 40 and a speed N2 of the driving shaft 60. The gear ratio return control unit 7b can find the gear ratio Rm based on a ratio of the speeds (N1/N2). Or, instead of detecting the speed of each of the shafts 22, 60, a position sensor may be provided for detecting an amount of movement L1 of the driving side movable pulley half 58c or an amount of movement L2 of the driven side movable pulley half 62b. The gear ratio return control unit 7b may then be able to find the gear ratio Rim based on the amount of movement L1 or L2.

It should be noted that the amount of movement L1 of the driving side movable pulley half 58c and the amount of movement L2 of the driven side movable pulley half 62b have a relation of predetermined correspondence. If the position sensor is used as the gear ratio sensor 12, an arrangement may be made to find only the amount of movement of either the driving side movable pulley half 58c or the driven side movable pulley half 62b.

In step S4, the gear ratio Rm is compared with a reference gear ratio Rref. It is thereby determined whether the gear ratio is in a low gear ratio state (low state) that ensures sufficient acceleration performance at starting. If it is determined that the engine 20 is stationary before the gear ratio of the continuously variable transmission 23 lowers sufficiently and the gear ratio Rm is not the low state, the operation proceeds to step S5. In step S5, the ACG starter motor 21a is driven backward at a speed slightly above the clutch-in speed (about 3000 rpm according to the illustrative embodiment of the present invention) of the starting clutch 40.

At this time, power of the ACG starter motor 21a is transmitted to the driving side transmission pulley 58 via the starting clutch 40. When the driving side transmission pulley 58 is driven, the driven side transmission pulley 62 is also driven through the V belt 63. In a low speed range, however, the driven side movable pulley half 62b is urged toward the driven side fixed pulley half 62a by the spring 64. The winding diameter of the V belt 63 is then enlarged. Then in the driven side transmission pulley 58, the groove width formed by the driving side fixed pulley half 58a and the driving side movable pulley half 58c is narrowed to overcome the centrifugal force of the weight roller 58b. Then the winding diameter of the V belt 63 starts decreasing.

According to the illustrative embodiment of the present invention, the output shaft 60 of the continuously variable transmission 23 is connected to the driving shaft through the one-way clutch 44. The one-way clutch 44 turns idly relative to a backward drive of the output shaft 60. Accordingly, a backward drive of the ACG starter motor 21a for forcing to drive the continuously variable transmission 23 is not transmitted to the driving wheel.

In step S6, the gear ratio Rm of the continuously variable transmission 23 is obtained as in step S3. In step S7, the gear ratio Rm is compared against the reference gear ratio Rref. It is thereby determined whether the gear ratio is lowered to the low state, in which sufficient acceleration performance can be obtained for getting the vehicle started.

Until it is determined that the continuously variable transmission 23 is in the low state, the operation returns to step S5, in which the crankshaft 22 is driven backward at a low speed by the ACG starter motor 21a. If it is thereafter determined in step S7 that the gear ratio Rm has been lowered to the low gear ratio state, the operation proceeds to step S8. In step S8, the backward driving of the ACG starter motor 21a at low speed is stopped.

In the hybrid vehicle having the arrangements as described in the foregoing, the ACG starter motor 21a mounted on the crankshaft 22 is used to turn the crankshaft 22 when the engine is to be started. At this time, the starting clutch 40 is not engaged; meaning that power transmission from the crankshaft 22 to the continuously variable transmission 23 is shut off.

When the speed of the crankshaft 22 exceeds a predetermined value (e.g., 3000 rpm) corresponding to the amount of operation of the throttle grip, rotational power of the crankshaft 22 is transmitted to the continuously variable transmission 23, the one-way clutch 44, and the reduction mechanism 69 through the starting clutch 40. This drives the rear wheel WR. It is possible, during this starting, to operate the driving motor 21b through power supplied from the battery 74 and thereby assist rotation of the driving shaft 60 by engine power.

Instead of using the engine 20 for starting, it is also possible to start the vehicle using only the driving motor 21b. In this case, rotation of the driving shaft 60 through the driving motor 21b is not transmitted to the driven side transmission pulley 62 through the functioning of the one-way clutch 44. The continuously variable transmission 23 can then never be driven. Accordingly, running the vehicle by driving the rear wheel WR only with the driving motor 21b enhances energy transmission efficiency.

Under heavy loads, such as during acceleration or running at high speeds, while the vehicle is run only with the engine 20, the driving motor 21b can be used to assist the engine in running the vehicle. At this time, the rotational power of the crankshaft 22 derived from a reciprocating motion of the piston 25 is transmitted to the driving shaft 60 via the starting clutch 40, the continuously variable transmission 23, and the one-way clutch 44. At the same time, power from the driving motor 21b is also transmitted to the driving shaft 60 through the one-way clutch 44. A combined power from these different sources drives the rear wheel WR through the reduction mechanism 69. On the contrary, running by the driving motor 21b can be assisted with the engine 20 while the vehicle is run only with the driving motor 21b.

If only the driving motor 21b is used as the power source during running at a constant speed (cruise running), and if the connection speed (the aforementioned predetermined value) of the starting clutch 40 is not reached even when the engine 20 is driven, power can be generated using the ACG starter motor 21a without driving the continuously variable transmission 23.

When the vehicle is run using only the driving motor 21b as the power source during this cruise running, power is transmitted from the driving motor 21b to the rear wheel WR without driving the continuously variable transmission 23. Hence, good energy transmission efficiency is achieved.

During deceleration, the one-way clutch 44 does not transmit rotation of the driving shaft 60 to the driven side transmission pulley 62 of the continuously variable transmission 23, and rotational power of the axle 68 can be directly recovered for the driving motor 21b via the reduction mechanism 69 without driving the continuously variable transmission 23.

Specifically, during regenerative operation from the rear wheel WR to the driving motor 21b, power transmitted from the rear wheel WR to the driving motor 21b is not consumed in driving the continuously variable transmission 23. This improves recharging efficiency during regeneration.

The engine 20 may stop before the continuously variable transmission 23 is returned to the low gear ratio state as the vehicle is halted from a running state. When this happens, and if the continuously variable transmission 23 is in a state other than the low gear ratio state, the crankshaft 22 is forced into a backward drive at a speed slightly above the clutch-in speed of the starting clutch 40. This returns the continuously variable transmission 23 to the low gear ratio state. The vehicle can then start from the low gear ratio state, thus ensuring good acceleration performance.

Further, according to the illustrative embodiment of the present invention, the ACG starter motor 21a is used for forced drive of the continuously variable transmission 23. This eliminates the need for restarting the engine 20 when returning the continuously variable transmission 23 to the low gear ratio state. Moreover, according to the illustrative embodiment of the present invention, the output shaft of the continuously variable transmission 23 is connected to the driving shaft 60 through the one-way clutch 44. Accordingly, if the ACG starter motor 21a is driven backward when the continuously variable transmission 23 is forcedly driven, it is not necessary to dispose any additional mechanism for shutting off transmission power between the continuously variable transmission 23 and the driving shaft 60.

Figure 6:
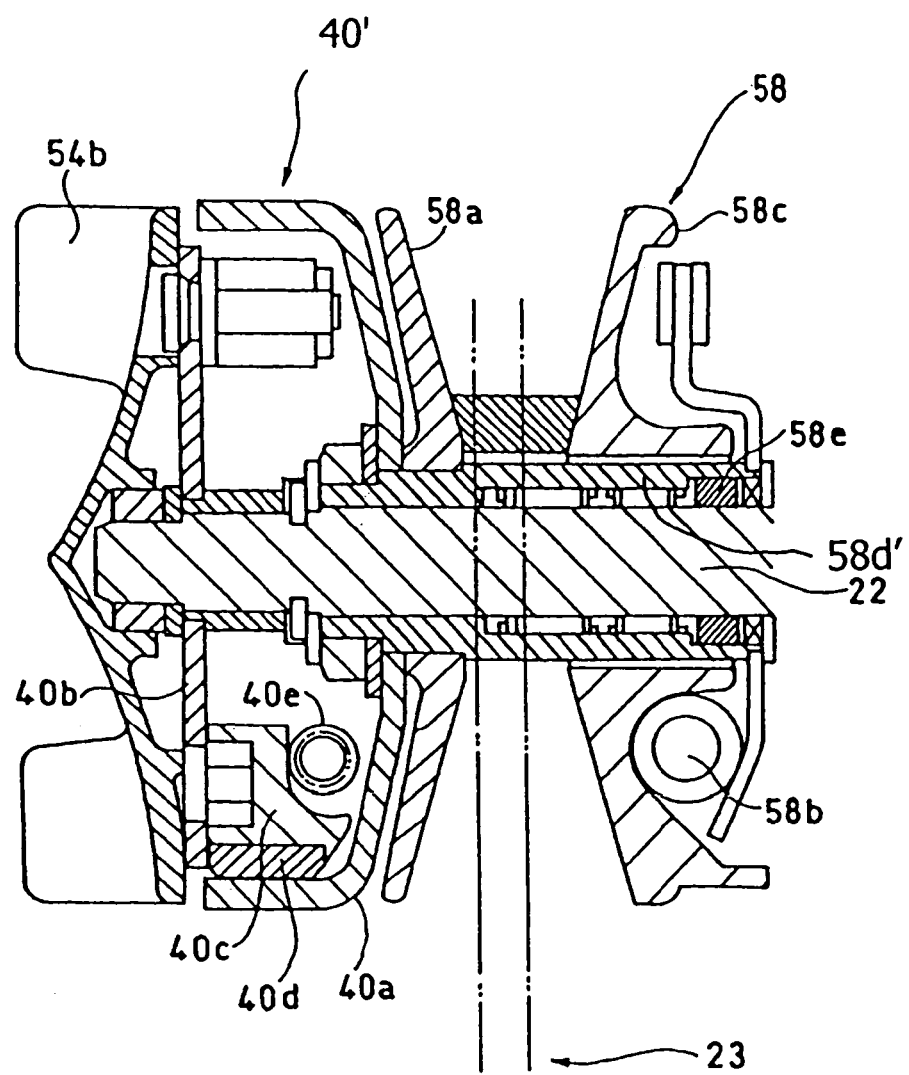
FIG. 6 is a detail cross sectional of a second embodiment of a one way clutch suitable for use with a continuously variable transmission control system according to the present invention.

FIG. 6 shows the structure of a starting clutch 40' according to a second illustrative embodiment of the present invention. In this second embodiment, the starting clutch 40' functions as a second one-way clutch at low rotary speeds, as will be explained subsequently. Similar parts are identified by the same reference numerals as those used heretofore.

According to the first illustrative embodiment of the present invention, the sleeve 58d' is circumferentially rotatably mounted on the crankshaft 22, while being restricted in its axial movement relative to the crankshaft 22. To turn the driving side transmission pulley 58 backward, therefore, it is necessary to turn the crankshaft 22 backward at a speed higher than the clutch-in speed of the starting clutch 40'.

According to the second illustrative embodiment of the present invention, on the other hand, a roller 58e is disposed between an inner periphery of a sleeve 58d' and an outer periphery of a crankshaft 22. The roller 58e functions to transmit a backward drive of the crankshaft 22 to the sleeve 58d', while turning idly relative to a forward drive of the crankshaft 22. A one-way clutch is formed in this manner, including the crankshaft 22 as a clutch inner and the sleeve 58d' as a clutch outer. By turning the crankshaft 22 backward, a driving side transmission pulley 58 according to the second illustrative embodiment of the present invention can be turned backward in synchronism with the backward rotation of the crankshaft 22 regardless of the speed of the crankshaft 22.

According to the second illustrative embodiment of the present invention, the driving side transmission pulley 58 can be turned backward without having to increase the backward rotation speed of the crankshaft 22 to the clutch-in speed of the starting clutch 40'. The gear ratio of a continuously variable transmission 23 can be returned to the low gear ratio state with small power consumption.

The present invention is not limited to the aforementioned embodiments and can be implemented in various manners without departing from the spirit thereof. For instance, models to which the present invention is applied may be a three-wheeled vehicle, a four-wheeled vehicle, or any other moving body, in addition to the two-wheeled vehicle.

Having thus, described the invention, what is claimed is:

1. A control apparatus for a belt-type continuously variable transmission connected to an engine, the continuously variable transmission having a starting clutch, a driving shaft, an input shaft operatively connected to a crankshaft of the engine through the starting clutch, and an output shaft fixedly connected to the driving shaft and coaxial therewith,
   wherein the crankshaft rotates in a first direction of rotation during normal engine operation;
   wherein the starting clutch is adapted to operatively connect the transmission to the crankshaft when a speed of the crankshaft exceeds a predetermined value, thus allowing power of the engine to be transmitted to the driving shaft through the continuously variable transmission,
   wherein the control apparatus comprises:
   a first one-way clutch disposed between the output shaft of the continuously variable transmission and the driving shaft, the first one-way clutch being capable of rotating idly relative to a backward drive of the output shaft;
   a gear ratio detector for detecting a gear ratio of the continuously variable transmission;
   an engine state detector for detecting whether the engine is stationary or moving; and
   a crankshaft driver which is capable of selectively and temporarily driving the crankshaft in a direction opposite to the first direction of rotation thereof such that the belt of the continuously variable transmission rotates backward, when the engine is in a stationary state, and the gear ratio of the continuously variable transmission is greater than a predetermined reference value.

2. The control apparatus for the continuously variable transmission mechanism according to claim 1, wherein a driving motor provides a power source for a vehicle and is directly connected to the driving shaft while bypassing the continuously variable transmission.

3. The control apparatus for the continuously variable transmission mechanism according to claim 1, wherein a driving motor provides a power source for a vehicle concurrent with the engine, the engine and the driving motor each connected to the driving shaft via the first one-way clutch.

4. The control apparatus for the continuously variable transmission mechanism according to claim 1, further comprising:
   a second one-way clutch disposed between the crankshaft and a driving pulley of the continuously variable transmission, the second one-way clutch provided for transmitting a backward drive of the crankshaft to the driving pulley, while turning idly relative to a forward drive of the crankshaft.

5. The control apparatus for the continuously variable transmission mechanism according to claim 1, wherein the crankshaft driver stops driving the crankshaft when the gear ratio of the continuously variable transmission decreases to the predetermined reference value.

6. The control apparatus for the continuously variable transmission mechanism according to claim 1, wherein the gear ratio detector detects the gear ratio based on a ratio of a speed of the input shaft to a speed of the output shaft of the continuously variable transmission.

7. The control apparatus for the continuously variable transmission mechanism according to claim 1,
   wherein the continuously variable transmission has a driving pulley on the input shaft thereof and a driven pulley on the output shaft thereof,
   wherein each of the driving pulley and the driven pulley includes a fixed pulley part and a movable pulley part,
   and wherein the gear ratio detector is operable to detect the gear ratio based on an amount of movement of at least the movable pulley part of either the driving pulley or the driven pulley.

8. The control apparatus for the continuously variable transmission mechanism according to claim 1, wherein a driving motor is a power source for a vehicle and is connected to the driving shaft.

9. The control apparatus for a continuously variable transmission mechanism according to claim 1, wherein the crankshaft driver includes a motor connected to the crankshaft and a driver controller for controlling the motor.

10. The control apparatus for the continuously variable transmission mechanism according to claim 9, wherein the driver controller is operable to turn the crankshaft backward at a speed at which the starting clutch is connected.

11. A control apparatus for a continuously variable transmission mechanism of an engine having a belt-type continuously variable transmission, the continuously variable transmission comprising:
   a starting clutch;
   a driving shaft;
   an input shaft operatively connected to a crankshaft of the engine through the starting clutch;
   an output shaft fixedly connected to the driving shaft and coaxial therewith,
   wherein the crankshaft rotates in a first direction of rotation during normal engine operation;
   wherein the starting clutch is connected to the crankshaft when a speed of the crankshaft exceeds a predetermined value, thus allowing power of the engine to be transmitted to the driving shaft through the continuously variable transmission,
   the control apparatus comprising:
   a gear ratio detector for detecting a gear ratio of the continuously variable transmission;
   an engine state detector for detecting whether the engine is in a stationary state; and
   an electric motor operatively connected to the crankshaft, said motor being capable of selectively and temporarily driving the crankshaft in a direction opposite to the first direction of rotation thereof such that the belt of the continuously variable transmission rotates backward when the engine is in a stationary state, and the gear ratio of the continuously variable transmission is greater than a predetermined reference value.

12. The control apparatus for the continuously variable transmission mechanism according to claim 11, wherein the motor drives the crankshaft backward at a speed at which the starting clutch is connected.

13. The control apparatus for the continuously variable transmission mechanism according to claim 11, the control apparatus further comprising:
   a first one-way clutch disposed between the output shaft of the continuously variable transmission and the driving shaft, the first one-way clutch rotating idly relative to a backward drive of the output shaft; and
   a second one-way clutch disposed between the crankshaft and a driving pulley of the continuously variable transmission, the second one-way clutch for transmitting a backward drive of the crankshaft to the driving pulley, while turning idly relative to a forward drive of the crankshaft.

14. The control apparatus for the continuously variable transmission mechanism according to claim 11, wherein the motor stops driving the crankshaft when the gear ratio of the continuously variable transmission decreases to the predetermined reference value.

15. The control apparatus for the continuously variable transmission mechanism according to claim 11, wherein the gear ratio detector detects the gear ratio based on a ratio of a speed of the input shaft of the continuously variable transmission to a speed of the output shaft thereof.

16. The control apparatus for the continuously variable transmission mechanism according to claim 11, wherein the continuously variable transmission has a driving pulley on the input shaft thereof and a driven pulley on the output shaft thereof,
   wherein each of the driving pulley and the driven pulley includes a fixed pulley part and a movable pulley part,
   and wherein the gear ratio detector is operable to detect the gear ratio based on an amount of movement of at least the movable pulley part of either the driving pulley or the driven pulley.

17. A method of controlling a continuously variable transmission mechanism of an engine having a belt-type continuously variable transmission, the continuously variable transmission comprising:
   a starting clutch;
   a driving shaft;

an input shaft connected to a crankshaft of the engine through the starting clutch, wherein the crankshaft rotates in a first direction during normal engine operation; and an output shaft fixedly connected to the driving shaft and coaxial therewith, wherein the staffing clutch is connected to the crankshaft when a speed of the crankshaft exceeds a predetermined value, thus allowing power of the engine to be transmitted to the driving shaft through the continuously variable transmission, the control apparatus comprising:
- a first one-way clutch disposed between the output shaft of the continuously variable transmission and the driving shaft, the first one-way clutch rotating idly relative to a backward drive of the output shaft;
- a gear ratio detector for detecting a gear ratio of the continuously variable transmission;
- an engine state detector for detecting whether the engine is in a stationary state; and
- an electric motor operatively attached to the crankshaft, said motor being capable of selectively and temporarily driving the crankshaft in a direction opposite to the first direction of rotation thereof such that the belt of the continuously variable transmission rotates backward when the engine is in a stationary state and the gear ratio of the continuously variable transmission is greater than a predetermined reference value, the method of controlling the continuously variable transmission comprising the following method steps:

step 1, determining the engine state via the engine state detector, and when the engine state is determined to be stationary, proceeding to step 2, otherwise repeating step 1, step 2, determining the gear ratio of the continuously variable transmission via the gear ratio detector, and when the gear ratio is less than or equal to a reference gear ratio returning to step 1, otherwise proceeding to step 3, step 3, activating the motor to drive the crankshaft in a reverse direction opposite to the first direction of rotation, step 4, determining the gear ratio of the continuously variable transmission via the gear ratio detector, and when the gear ratio is less than or equal to a reference gear ratio, terminating activation of the motor, otherwise returning to step 3.

18. The method of controlling a continuously variable transmission mechanism of an engine according to claim 17, wherein the motor drives the crankshaft backward at a speed at which the starting clutch is connected.

19. The method of controlling a continuously variable transmission mechanism of an engine according to claim 17, wherein the gear ratio detector detects the gear ratio based on a ratio of a speed of the input shaft of the continuously variable transmission to a speed of the output shaft thereof.

20. The method of controlling a continuously variable transmission mechanism of an engine according to claim 17, wherein the continuously variable transmission has a driving pulley on the input shaft thereof and a driven pulley on the output shaft thereof, each of the driving pulley and the driven pulley including a fixed pulley part and a movable pulley part, and the gear ratio detector detects the gear ratio based on an amount of movement of at least the movable pulley part of either the driving pulley or the driven pulley.

* * * * *